United States Patent [19]
Entwisle et al.

[11] 3,718,457
[45] Feb. 27, 1973

[54] PROCESS FOR THE RECOVERY OF MERCURY FROM WASTE BRINE FROM MERCURY CELLS

[75] Inventors: John Hubert Entwisle; Robert William Griffiths, both of Runcorn, England

[73] Assignee: Imperial Chemical Industries Limited, London, England; by said Entwisle

[22] Filed: Jan. 29, 1971

[21] Appl. No.: 111,091

[30] Foreign Application Priority Data

Feb. 20, 1970 Great Britain..................8,226/70

[52] U.S. Cl. ..................75/108, 75/121, 423/561, 423/562, 210/503
[51] Int. Cl............................................C22b 43/00
[58] Field of Search..23/134, 1 R; 210/503; 423/561, 423/562, 511; 75/108, 121

[56] References Cited

UNITED STATES PATENTS

| | | | |
|---|---|---|---|
| 1,777,546 | 10/1930 | Blumenberg, Jr. | 210/503 X |
| 1,981,877 | 11/1934 | Pierce | 210/503 X |
| 2,057,237 | 10/1936 | Hoop | 210/503 X |
| 2,555,970 | 6/1951 | Hudson, Jr. | 210/503 X |
| 2,860,952 | 11/1958 | Bergeron et al. | 23/134 |
| 3,085,859 | 4/1963 | Scholten et al. | 23/134 |
| 3,382,983 | 5/1968 | Stewart | 210/503 X |
| 2,885,282 | 5/1959 | Neipert et al. | 75/121 |

FOREIGN PATENTS OR APPLICATIONS

| | | | |
|---|---|---|---|
| 649,382 | 9/1962 | Canada | 75/121 |

*Primary Examiner*—Edward Stern
*Attorney*—Cushman, Darby & Cushman

[57] ABSTRACT

A process for recovering mercury from waste brine from mercury cells comprising adding sulphide or hydrosulphide ions to the brine to precipitate mercury sulphide, trapping the mercury sulphide on a mixed media filter in which the average size of particles in successive super-imposed layers decreases and the specific gravity of the particles increases from the top of the filter downwards, removing the mercury sulphide from the filter by backwashing with an aqueous liquor, separating the mercury sulphide from the backwash liquor and treating the sulphide to produce metallic mercury.

11 Claims, No Drawings

PROCESS FOR THE RECOVERY OF MERCURY FROM WASTE BRINE FROM MERCURY CELLS

This invention relates to the treatment of waste brine from a mercury cell.

Waste brine from mercury cells usually contains dissolved chlorine together with mercury in amounts of up to 20 mg/l. Considerable cost savings can be made if the mercury can be effectively recovered.

In our U. K. Pat. Specification No. 916,866 we have described a process for removal of mercury from waste brine in which mercury is precipitated as mercuric sulphide by adding a source of sulphide ions, together with an alkali to ensure that the sulphide is precipitated in a neutral or alkaline medium. This process produces a precipitate which is very finely divided and difficult to remove.

We have now found that mercury can be effectively removed from waste brine using a mixed media filter to remove a mercuric sulphide precipitate which has been formed without the necessity of ensuring a neutral or alkaline medium.

Thus, according to the invention, there is provided a process for the removal of mercury from chlorine-containing waste brine from a mercury cell which comprises adding sulphide or hydrosulphide ions to the brine in sufficient amount to produce a redox potential of the brine, relative to a saturated KCl-Calomel electrode, of a value more negative than +0.45 volts, preferably +0.25 volts, whereby mercury sulphide is precipitated; and removing the precipitated mercuric sulphide by passing the brine downwards through a filter which comprises at least two directly-superimposed layers of granular filtration material, the average size of the particles of granular material in the successive superimposed layers decreasing and the specific gravity of the granular material increasing, from the top of the filter downwards.

Usually the precipitate is removed from the filter by backwashing with a liquid, generally water, and preferably also by scouring with a gas, generally air. Preferably the gas is blown upwards to dislodge adherent solids from the filter materials and then the liquid is passed upwards through the bed to fluidize it and remove the precipitate from it. Generally, after the precipitate has been removed, the liquid flow rate is decreased in stages until the bed has settled back substantially to its original form. Since the specific gravity of at least two superimposed layers of the media increases from top to bottom, the rate of settling also increases from top to bottom with the result that the lower layers settle more rapidly than the higher layers and the original structure of the filter is substantially retained.

The backwash liquor is allowed to stand and the precipitate settles rapidly since it is usually a well coagulated coarse and dense solid which can easily be separated from the supernatant liquid by any convenient means.

Metallic mercury can be recovered from the precipitate by any convenient means, for instance by heating with, for example, iron or lime or by dissolving in an alkaline sulphide solution and reducing the solution electrolytically or with a reducing agent, for example sodium amalgam.

It is desirable to remove as much chlorine from the brine as possible, before treatment with the sulphide or hydrosulphide. The brine usually contains about 400 ppm of free chlorine and this may be reduced to as low as 30 ppm by air-blowing. Dechlorination is usually completed by the sulphide or hydrosulphide ions, for example according to equation $$4Cl_2 + HS^- + 4H_2O \rightarrow HSO_4^- + 8HCl$$

As a source of sulphide or hydrosulphide ions there is usually used an alkali metal sulphide or hydrosulphide. Sodium hydrosulphide is generally preferred.

The materials which can be used to make up the filter may be any suitable material as long as in at least two directly superimposed layers the average size of the particles in the successive layers decreases and the specific gravity increases from the top of the filter downwards.

Examples of suitable materials include anthracite, coal, activated carbon, graphite, quartz, flint, silica, magnesia, alumina, garnet and sand.

It is preferable that the waste brine is treated to remove insoluble matter, e.g. graphite, before addition of the sulphide or hydrosulphide. This may be carried out by any convenient means, for example by filtration of the brine, e.g. with a filter of the type used to remove the mercuric sulphide precipitate or a precoat filter, such as a precoat charcoal filter. Other additional or alternative means for the insoluble matter removal include using a hydrocyclone. This treatment may be carried out before or after any air-blowing to remove chlorine.

Although the invention is generally applicable to the treatment of acidic brine the pH is not critical, and it is possible to purify brine having a pH in the range of, for example, 1 to 11. However it is particularly preferred that during the precipitation the pH is maintained in the range 5 to 7.

The invention is illustrated in the following Examples in which "ppm" stands for parts per million, weight/volume.

EXAMPLE 1

100 liters of effluent brine from a mercury cell which had been air-blown to reduce the available chlorine to 70 ppm and which contained 10 ppm Hg was passed through a reaction vessel at a rate of 20 liters/hr and treated continuously with sodium sulphide solution to maintain the oxidation potential measured with a platinum electrode and a saturated calomel electrode at +0.1 volt. Mercuric sulphide was precipitated as an extremely fine, black precipitate and was filtered by passing the bring through a 5 cm diameter mixed media filter comprising a 2.5 cm deep top layer of 7–10 B.S. mesh (particle size of 1.7 to 2.4 mm) anthracite having a specific gravity of 1.4, a 2.5 cm deep intermediate layer of 18–25 B.S. mesh (particle size of 0.6 to 0.85 mm) flint having a specific gravity of 2.65 and a 5 cm deep layer of 30–36 B.S. mesh (particle size of 0.4 to 0.5 mm) alumina having a specific gravity of 3.9. This bed was supported by a 2.5 cm layer of 6–8 B.S. mesh (particle size 2.0 to 2.8 mm) alumina and a 3.8 cm layer of 0.6 to 1.3 cm diameter pebbles on a perforated titanium plate. The effluent brine after filtration contained less than 0.1 ppm Hg and no free chlorine.

The precipitate was removed from the bed by passing air upwards through the bed and then passing water upwards through the bed to fluidize it and then remove the precipitate from it. The backwash liquor was collected in a separating funnel and the mercuric sulphide precipitate allowed to settle. The precipitate, which was coarse and dense, settled in a few minutes and was easily separated from the supernatant liquor.

The precipitate recovered from the filter weighed 1.04 g representing 90 percent mercury recovery.

EXAMPLE 2

Effluent brine from a mercury cell, which had been air-blown to reduce the available chlorine to 70 ppm, was passed through two filters in parallel of the type described in Example 1 except that they each had a diameter of 15 cm. The total flow rate through these filters was 1 m³/hr. This filtering reduced the level of insoluble graphite in the brine. The brine was then treated as described in Example 1 to precipitate mercuric sulphide. The brine was then filtered on a filter of the type described in Example 1 except that it had a diameter of 10 cm and each layer of material had a depth of 23 cm. The filtered brine was analyzed for mercury content and hence removal efficiency.

The precipitate was removed from the bed by passing air at a pressure of 0.3 to 0.4 kg/cm² gauge upwards through the bed for 2 to 3 minutes. Water at the rate of 8 to 10 liters/minute was then passed upwards to remove the precipitate. The backwash liquor was then collected and analyzed for mercury content. The precipitate could easily be removed in a separating funnel.

The results of a number of runs are shown in the following Table.

TABLE

| Run No. | Initial concentration of Hg in brine (p.p.m.) | Flow rate through filter (m.³/hour) | Volume of brine filtered (m.³) | Weight of solids from backwash (g.) | Estimated mercury recovery (percent) | Removal efficiency half way through run (percent) |
|---|---|---|---|---|---|---|
| 1 | 1.8 | 0.25 | 19 | 104 | 93 | 96 |
| 2 | 1.8 | 0.52 | 11.5 | 143 | 96 | 92 |
| 3 | 1.8 | 0.25 | 17.5 | 138 | 77 | 98 |
| 4 | 2.0 | 0.37 | | | | >95 |

We claim:

1. A process for the recovery of mercury from chlorine containing waste brine from a mercury cell which comprises adding sulphide or hydrosulphide ions to the brine in sufficient amount to produce a redox potential of the brine, relative to a saturated KCl-Calomel electrode, of a value more negative than +0.45 volts whereby finely divided mercuric sulphide is precipitated; and removing the precipitated mercuric sulphide by passing the brine through a filter which comprises at least two directly superimposed layers of granular filtration material, the average size of the particles of said granular material in successive superimposed layers decreasing and the specific gravity of the granular material increasing from the top of the filter downwards removing the precipitated mercuric sulphide from the filter by backwashing the filter with a liquor, separating the precipitate from said backwash liquor and recovering metallic mercury from the precipitate.

2. A process according to claim 1 in which the redox potential produced is of a value more negative than +0.25 volts.

3. A process according to claim 2 in which the bed is also scoured with a gas.

4. A process according to claim 2 in which the backwashing is carried out using water.

5. A process according to claim 3 in which the scouring is carried out with air.

6. A process according to claim 1 in which the brine is treated by air-blowing to reduce the free chlorine content before treatment with the sulphide or hydrosulphide.

7. A process according to claim 1 in which as a source of sulphide or hydrosulphide ions there is used an alkali metal sulphide or hydrosulphide.

8. A process according to claim 7 in which the alkali metal sulphide or hydrosulphide is sodium sulfide or is sodium hydrosulphide.

9. A process according to claim 1 in which the filter comprises granular filtration material selected from coal, activated carbon, graphite, quartz, flint, silica, magnesia, alumina, garnet and sand.

10. A process according to claim 1 in which the waste brine is treated to remove insoluble matter before addition of the sulphide or hydrosulphide.

11. A process according to claim 10 in which the waste brine is filtered.

* * * * *